US007627471B2

(12) United States Patent
Creamer et al.

(10) Patent No.: US 7,627,471 B2
(45) Date of Patent: *Dec. 1, 2009

(54) PROVIDING TRANSLATIONS ENCODED WITHIN EMBEDDED DIGITAL INFORMATION

(75) Inventors: Thomas E. Creamer, Boca Raton, FL (US); Peeyush Jaiswal, Boca Raton, FL (US); Victor S. Moore, Lake City, FL (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/145,177

(22) Filed: Jun. 24, 2008

(65) Prior Publication Data

US 2008/0255825 A1 Oct. 16, 2008

Related U.S. Application Data

(63) Continuation of application No. 10/736,390, filed on Dec. 15, 2003, now Pat. No. 7,406,414.

(51) Int. Cl.
*G10L 15/26* (2006.01)
*G10L 19/00* (2006.01)

(52) U.S. Cl. ....................................... 704/235; 704/201

(58) Field of Classification Search ....................... None
See application file for complete search history.

(56) References Cited

U.S. PATENT DOCUMENTS

| | | | |
|---|---|---|---|
| 5,960,398 | A | 9/1999 | Fuchigami et al. |
| 6,144,723 | A | 11/2000 | Truchon et al. |
| 6,151,576 | A | 11/2000 | Warnock et al. |
| 6,173,317 | B1 | 1/2001 | Chaddha et al. |
| 6,212,199 | B1 | 4/2001 | Oxford |
| 6,233,389 | B1 | 5/2001 | Barton et al. |
| 6,370,506 | B1 | 4/2002 | Ahluwalia |
| 6,434,253 | B1 | 8/2002 | Hayashi et al. |
| 6,490,550 | B1 | 12/2002 | Hiri |
| 6,504,910 | B1 | 1/2003 | Engelke et al. |
| 6,570,964 | B1 | 5/2003 | Murveit et al. |
| 6,820,055 | B2 | 11/2004 | Saindon et al. |
| 7,117,152 | B1 | 10/2006 | Mukherji et al. |

*Primary Examiner*—David R Hudspeth
*Assistant Examiner*—Samuel G Neway
(74) *Attorney, Agent, or Firm*—Wolf, Greenfield & Sacks, P.C.

(57) ABSTRACT

A method of providing a translation within a voice stream can include receiving a speech signal in a first language, determining text from the speech signal, translating the text to a second and different language, and encoding the translated text within the speech signal.

14 Claims, 1 Drawing Sheet

PROVIDING TRANSLATIONS ENCODED WITHIN EMBEDDED DIGITAL INFORMATION

CROSS REFERENCE TO RELATED APPLICATIONS

This application is a continuation of, and accordingly claims the benefit from, U.S. patent application Ser. No. 10/736,390, now issued U.S. Pat. No. 7,406,414, which was filed in the U.S. Patent and Trademark Office on Dec. 15, 2003.

BACKGROUND

1. Field of the Invention

The invention relates to speech or voice translation systems.

2. Description of the Related Art

Spoken language is typically the most natural, most efficient, and most expressive means of communicating information, intentions, and wishes. Speakers of different languages, however, face a formidable problem in that communication is thwarted unless the language barrier is removed. As the global economy brings together persons of various nationalities, a forum is needed that provides efficient and accurate communication, which effectively eliminates the language barrier.

Translation systems have emerged to address this need. Presently available translation systems are capable of receiving a speech signal in a first language. Typically, the speech signal is provided to a speech recognition system to determine a textual transcript from the speech signal. The textual transcript then can be processed or translated into a different language, for example through the use of a translation system such as one using natural language processing. The resulting translated text then can be provided to another person or device as text or played through a text-to-speech system.

SUMMARY OF THE INVENTION

The present invention provides a method, system, and apparatus for including transcription information within a voice stream or speech signal. One aspect of the present invention can include a method of providing a translation within a voice stream. The method can include receiving a speech signal in a first language, determining text from the speech signal, and translating the text to a second and different language.

The method further can include encoding the translated text within the speech signal. For example, the encoding step can include the translated text within the speech signal as digital information. The resulting speech signal can specify both speech in the first language and a textual translation of the original speech in the second and different language. The encoding step can include removing inaudible portions of the voice signal and embedding the translated text in place of the inaudible portions of the speech signal.

Another embodiment of the present invention can include transmitting the resulting speech signal. The speech signal specifying the translated text can be received and the translated text can be decoded. Accordingly, a representation of the translated text can be presented. Additionally, an audible representation of the received speech signal can be played. Notably, the audible representation of the received speech signal can be played substantially concurrently with the presentation of the translated text.

Other embodiments of the present invention can include a system having means for performing the various steps disclosed herein and a machine readable storage for causing a machine to perform the steps described herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
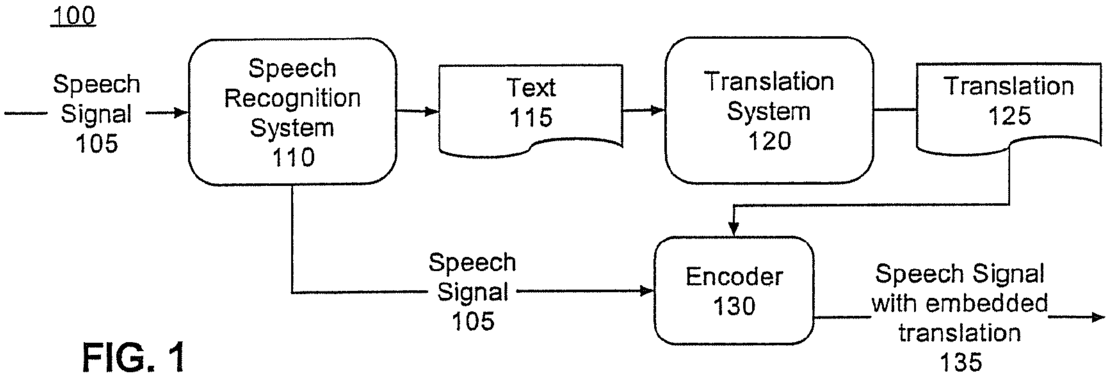
FIG. 1 is a schematic diagram illustrating a system for providing a translation within an audio stream in accordance with the inventive arrangements disclosed herein.

FIG. 1 is a schematic diagram illustrating a system 100 for providing a translation within a voice stream in accordance with the inventive arrangements disclosed herein. As shown, the system 100 can include a speech recognition system 110, a translation system 120, and an encoder 130.

The speech recognition system 110 can receive digitized speech signals 105 and produce a textual representation from the speech signals. That is, the speech recognition system 110 can convert received speech to text 115. Notably, the speech recognition system 110 can time stamp the recognized text 115 so that the text 115, or a derivative thereof, can be aligned with the original speech signal 105 at a later time. The speech recognition system 110 can provide the original speech signals 105 to the encoder 130. The speech recognition system 110 also can time stamp the speech signals 105 provided to the encoder 130.

The translation system 120 can translate the text 115 to a second and different language to produce a translation 125, which is a textual translation of text 115. The translation system 120 also can preserve any timing information that may be included within the recognized text 115 provided by the speech recognition system 110.

The encoder 130 can receive both the speech signals 105 and the translation 125. The encoder 130 can encode the text of the translation 125 into the speech signal 105, resulting in speech signal 135 having embedded digital information specifying a textual representation of the speech signal 105, where the textual representation is in a different language than the original speech.

More particularly, one aspect of the encoder 135 can be implemented as a perceptual audio processor, similar to a perceptual codec, to analyze the received speech signal 105. A perceptual codec is a mathematical description of the limitations of the human auditory system and, therefore, human auditory perception. Examples of perceptual codecs can include, but are not limited to MPEG Layer-3 codecs and MPEG Layer-4 codecs. The encoder 135 is substantially similar to the perceptual codec with the noted exception that the encoder 135 can, but need not implement, a second stage of compression as is typical with perceptual codecs.

The encoder 135, similar to a perceptual codec, can include a psychoacoustic model to which source material, in this case the speech signal 105, can be compared. By comparing the speech signal 105 with the stored psychoacoustic model, the perceptual codec identifies portions of the speech signal 105 that are not likely, or are less likely to be perceived by a listener. These portions are referred to as being inaudible.

Typically a perceptual codec removes such portions of the source material prior to encoding, as can the encoder 135. The encoder 135, however, adds the translation 125 as embedded digital information in place of the removed inaudible portions of the speech signal 105.

Still, those skilled in the art will recognize that the present invention can utilize any suitable means or techniques for digitally encoding the translation 125 and embedding such digital information within a digital voice stream or speech signal. As such, the present invention is not limited to the use of one particular encoding scheme.

Figure 2:
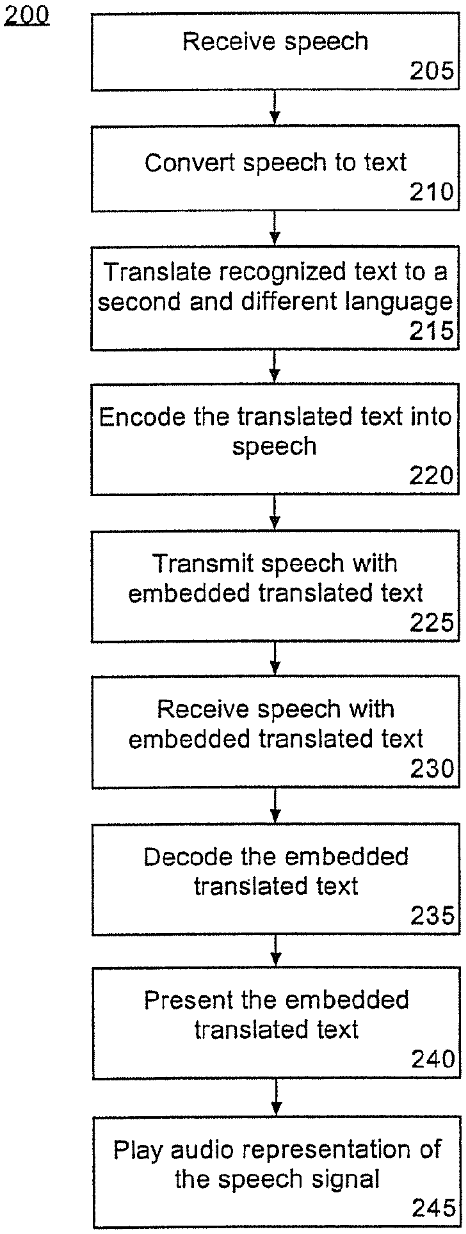
FIG. 2 is a flow chart illustrating a method of providing a translation within an audio stream in accordance with the inventive arrangements disclosed herein.

FIG. 2 is a flow chart illustrating a method 200 of providing a translation within a voice stream in accordance with the inventive arrangements disclosed herein. The method can begin in step 205 where speech is received by the speech recognition system. As noted, the speech can be provided to the speech recognition system in digitized form and can be in a first language, such as English.

In step 210, the speech recognition system can convert the received speech to text. The speech recognition system further can provide the original speech signals as output to the encoder. As noted, the recognized text, as well as any speech provided from the speech recognition system can be time stamped so that recognized text, whether translated or not, can later be aligned with the original speech. In step 215, the text provided from the speech recognition system can be translated to a second and different language.

In step 220, the translated text can be encoded into the original speech. That is, the translated text can be embedded within the voice stream of the original speech. Accordingly, the original speech remains in the first language, for example English, while the encoded translated text is in a second and different language such as French or Japanese. Notably, the encoded translation can, but need not, be synchronized with the original speech when encoded.

The translation can be sent to another destination as an encoded stream of digital information embedded within the digital voice stream or speech signal. The encoder can identify which portions of the received speech signal are inaudible, for example using a psychoacoustic model. For instance, humans tend to have sensitive hearing between approximately 2 kHz and 4 kHz. The human voice occupies the frequency range of approximately 500 Hz to 2 kHz. As such, the encoder can remove portions of a speech signal, for example those portions below approximately 500 Hz and above approximately 2 kHz, without rendering the resulting speech signal unintelligible. This leaves sufficient bandwidth, in the case of a telephony voice stream, within which the translation can be encoded and sent. Still, it should be appreciated that other frequency ranges may be more optimal depending upon the bandwidth of the transmission channel.

The encoder further can detect sounds that are effectively masked or made inaudible by other sounds. For example, the encoder can identify cases of auditory masking where portions of the speech signal are masked by other portions of the speech signal as a result of perceived loudness, and/or temporal masking where portions of the speech signal are masked due to the timing of sounds within the speech signal.

It should be appreciated that as determinations regarding which portions of a speech signal are inaudible are based upon a psychoacoustic model, some users will be able to detect a difference should those portions be removed from the speech signal. In any case, inaudible portions of the speech signal can include those portions of the speech signal as determined from the encoder that, if removed, will not render the speech unintelligible or prevent a listener from understanding the content of the speech signal. Accordingly, the various frequency ranges disclosed herein are offered as examples only and are not intended as limitations of the present invention.

The encoder can remove the identified portions, i.e. those identified as inaudible, from the speech signal and add the translation in place of the removed portions of the speech signal. That is, the encoder replaces the inaudible portions of the speech signal with digital translation information.

In step 225, the resulting speech or voice stream, having translated text embedded therein, can be sent or transmitted to another destination or device. The resulting voice stream can be sent over any of a variety of different communications channels including, but not limited to, a telephony link, whether conventional or IP-based, a wireless communications channel, or the like.

In step 230, the other device can receive the speech and embedded translated text. The receiving device, or another device communicatively linked to the receiving device, can decode the embedded translated text in step 235. In step 240, the receiving device can present the embedded translated text. For example, the translated text can be presented visually or can be played audibly, for instance through a text-to-speech system. In step 245, the original speech in the first language can be played audibly. In one embodiment of the present invention, the presentation of the translated text and the playing of the original speech can occur substantially simultaneously. As both the translated text and the speech can include time stamp information, the presentation of both can be synchronized.

The inventive arrangements disclosed herein have been presented for purposes of illustration only. As such, the various examples presented herein should not be construed as a limitation of the present invention. For example, the particular languages used are not intended as a limitation on the present invention as the speech recognition and translation systems can operate on any of a variety of different languages. Further, in another embodiment, the present invention can provide an embedded transcript within the speech that is in the same language as the speech signal. In that case, rather than providing the text determined from the speech recognition system to the translation system, the text can be provided directly to the encoder to be embedded within the original speech signal or voice stream.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented system for providing a translation within a voice stream comprising:

at least one input for receiving a speech signal in a first language;

at least one computer capable of receiving the speech signal from the at least one input, the at least one computer configured to implement:

a speech recognizer for determining text from the speech signal;

a translation component for translating the textual representation to a second language different from the first language;

a time stamp component for adding time stamp information to each of a predetermined number of portions of the received speech signal and to each of a predetermined number of portions of the translated text; and an encoder for identifying within each portion of the speech signal in the voice stream one or more inaudible portions and for embedding each portion of the translated text in place of the identified inaudible portions, irrespective of whether the added time stamp information for the embedded text and a speech signal portion associated with the identified portion are synchronized.

2. The computer-implemented system of claim 1, further comprising a transmitter for transmitting the resulting speech signal.

3. The computer-implemented system of claim 1, wherein the encoder embeds the translated text within the voice stream as digital information to provide an encoded voice stream.

4. The computer-implemented system of claim 1, further comprising at least one device to receive the encoded voice stream and to decode the translated text.

5. The computer-implemented system of claim 4, wherein the at least one device is capable of presenting a representation of the translated text.

6. The computer-implemented system of claim 5, wherein the at least one device is capable of playing an audible representation of the received speech signal in the first language.

7. The computer-implemented system of claim 6, wherein the at least one device plays the audible representation of the received speech signal substantially concurrently with the presentation of the translated text.

8. A machine-readable storage, having stored thereon a computer program having a plurality of code sections executable by a machine for causing the machine to perform the steps of:

receiving a speech signal for the voice stream in a first language;

determining text from the speech signal;

translating the text to a second and different language;

adding time stamp information to each of a predetermined number of portions of the received speech signal and to each of a predetermined number of portions of the translated text;

identifying within each portion of the speech signal in the voice stream one or more inaudible portions; and embedding each portion of the translated text in place of the identified inaudible portions, irrespective of whether the added time stamp information for the embedded text and a speech signal portion associated with the identified portion are synchronized.

9. The machine-readable storage of claim 8, further comprising code sections for transmitting the resulting speech signal.

10. The machine-readable storage of claim 8, said embedding step further comprising code sections for including the translated text within the voice stream as digital information.

11. The machine-readable storage of claim 9, further comprising code sections for:

receiving the voice stream including the translated text; and decoding the translated text.

12. The machine-readable storage of claim 11, further comprising code sections for presenting a representation of the translated text.

13. The machine-readable storage of claim 12, further comprising code sections for playing an audible representation of the received speech signal.

14. The machine-readable storage of claim 13, further comprising code sections for playing the audible representation of the received speech signal substantially concurrently with the presentation of the translated text.

* * * * *